May 9, 1933.    R. HEIZMANN    1,908,349
SHOCK ABSORBER
Filed June 26, 1930
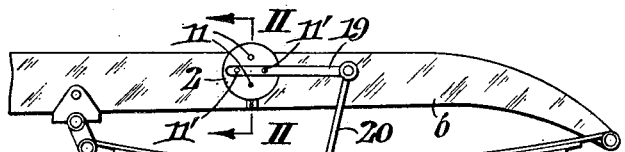
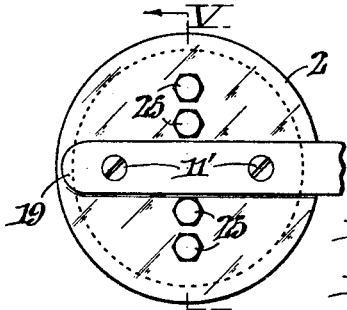
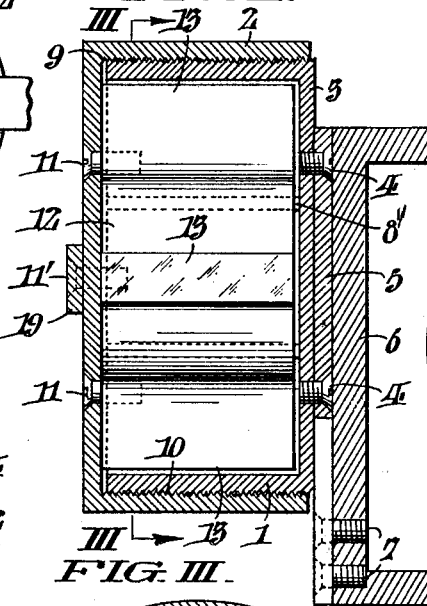
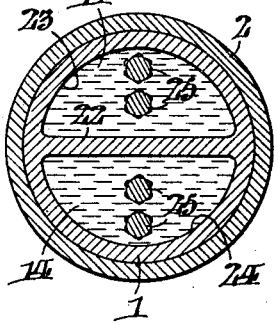
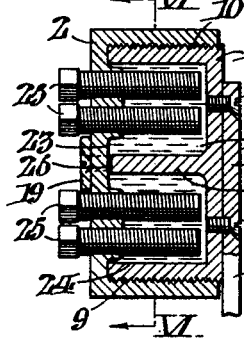
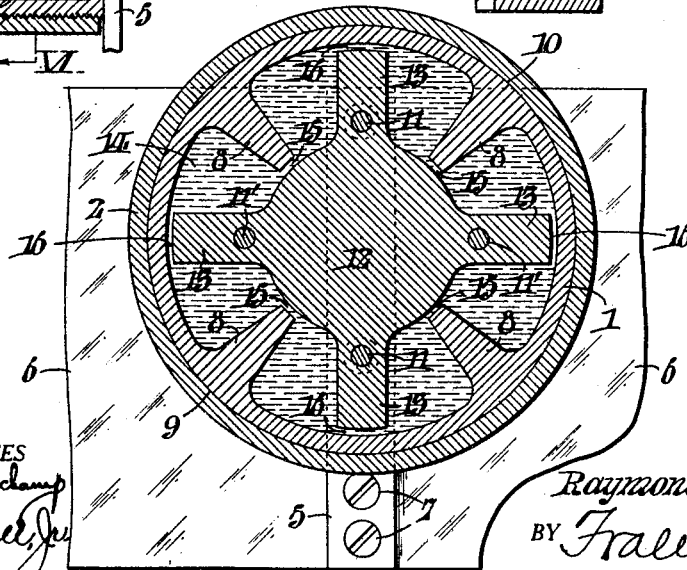
WITNESSES
INVENTOR:
Raymond Heizmann,
BY Fraley Paul
ATTORNEYS.

Patented May 9, 1933

1,908,349

UNITED STATES PATENT OFFICE

RAYMOND HEIZMANN, OF READING, PENNSYLVANIA

SHOCK ABSORBER

Application filed June 26, 1930. Serial No. 463,886.

This invention relates to fluid checking devices or shock absorbers, and it has more particular reference to the type intended for use on automobiles to supplement and control the rebound action of the customary leaf springs intermediate such vehicle chassis and the wheel axles.

The primary object of this invention is to provide an improved shock absorber characterized by the use of a semi-solid carbonaceous lubricative element as the checking medium, thereby eliminating the disadvantages inherent to freezing, thickening, and changing of the flow, common to the generality of known fluid shock absorbers.

Another object is to provide a shock absorber in which the checking medium is permitted appreciable flow past the movable component or components and a resistive stationary or adjustable element or elements to thereby better accommodate the variable demands of service.

A further object is to provide a shock absorber of simple construction which is devoid of packings or glands intermediate the rotative and stator components, with consequential elimination of leakage loss of the checking element.

With the above stated and other objects in view, the nature and advantages of my invention will be better understood when the following detailed explanation is read in conjunction with the accompanying drawing; said invention residing in the novel construction, combinations and arrangement of parts, as well as the involved method of absorbing shocks, hereinafter claimed.

In the drawing:

Fig. I is a side elevation illustrative of one adaptation of my invention to the frame and running gear of an automotive vehicle.

Fig. II is an enlarged vertical section, taken on the plane designated II—II in the preceding view.

Fig. III is a section, taken as indicated by the arrows III—III in Fig. II.

Fig. IV is an end view of a modified form of the invention.

Fig. V is a vertical section, taken on the plane designated V—V in the preceding view; and, Fig. VI is a lateral section on the plane VI—VI of Fig. V.

Referring more in detail firstly to Figs. I–III of the drawing, my improved rebound checking device or shock absorber comprises two main components, comprehensively designated 1 and 2, respectively; the former 1, of which will hereinafter be referred to as the stator, and the latter 2, as the rotor. The stator 1, it will be remarked, is in the nature of a cup-shaped cylindrical member, to the closed-in end 3 whereof there is secured, by appropriate fastening means 4, a bracket arm 5, through the medium of which the device is attached to the chassis or under frame 6, of an automotive vehicle, as by screws 7.

Formed integrally within the stator 1 are a series of radially directed baffles 8 of tapering cross-section, as best appreciated from Fig. III; said baffles extending from the closed-in end 3 to the open outer end of the startor 1.

Similarly the rotor 2 is of cup-shaped formation with the bore thereof screwthreaded at 9, for engagement with the correspondingly formed outer peripheral surface 10 of the stator 1. This feature of connecting the stator 1 and rotor 2 by screwthreading eliminates all packing media, while affording a bearing surface not susceptible to disadvantageous wear and incapable of disalignment.

Appropriately secured concentrically within the rotor 2, as by fastening means 11, is a spider 12, having a series of radial wings 13 radially located intermediate the baffles 8 of the stator 1; and functional, as said rotor oscillates about its axis, in conjunction with the baffles 8 in displacing the semisolid checking-medium 14, by way of the bypasses or flow-clearances 15, 16, respectively intervening the inner ends of said baffles and the hub portion of the spider 12, and the outer ends of the wings 13 and inner surface of the stator 1, as well as between the inner end of the spider 12 and the stator end wall 3; all as will be well understood from Figs. II and III.

Co-ordination of the rotor 2 with the element subject to shocks, in the instance illustrated, a wheel axle 17 supported below the chassis or underframe 6 by leaf springs 18 in the conventional manner, is effected by means of an arm 19 conveniently secured to said rotor by two of the fastening means 11' employed to fix the spider 12 in place. This arm 19 is articulated to the axle 17, Fig. I, by a connecting rod 20 and suitable fitting 21, in an obvious manner.

In the modified form of the device shown in Figs. IV-VI corresponding parts to those previously described are distinguished by the same reference characters, and only those differing therefrom will be described, in order to avoid repetitive description. In these views it is to be noted that the stator 1 is provided with an integrally formed diametric partition 22 dividing same into two communicating sections 23, 24 for the checking-medium 14, as will be best understood from Fig. V. Furthermore, the rotor 2 is fitted with suitable baffle units, for example screw studs 25, a plurality of which may be allocated to each section 23, 24 as shown, in lieu of the spider 12 above described.

From the foregoing it will be clearly obvious that, if either form of the device be filled with some semi-solid shock-checking medium, such as impalpably fine dry graphite for example; and assuming that the normal position of the rotor 2 and stator 1 are as illustrated in Figs. III and VI, upon movement of the rotor 2 clockwise or anticlockwise, there will ensue an appreciable flow or displacement of the dry graphite checking medium by way of the respective flow clearances 15, 16, of Fig. III, or the end clearance 26 of Fig. V, without any frictional restraint or leakage of said medium whatsoever from out of the device.

More specifically, the action of the device shown by Figs. IV-VI is as follows. When the screw studs 25 are withdrawn substantially from the sections 23, 24, there will be but little or any checking action. On the other hand, should the screw studs 25 be fully inserted, or approximately as shown, they function to practically neutralize or stop bumping action of the springs 18, as dry graphite possesses an inherent heavy checking action. With one of the studs 25 inserted in each section 25, and the others withdrawn, the action of the device is easy on hard bumps or impacts; or with both studs in, as shown, the action is hard upon hard bumps. Thus it will be apparent regulation of the device for every conceivable service requirement can be readily effected.

Incident to displacement or flow of the dry graphite checking medium 14 and its inherent frictionless resistive character, the general efficiency of the device is greatly enhanced. Furthermore, the "shock" absorbing action takes place smoothly and progressively in either direction due to the frictionless flow of the dry graphite around the edges and over the wings 13 and baffles 8, as well as similarly with reference to the screw studs 25 without any diminution whatsoever in its volume, so that the varying conditions of operation are compensatively met irrespective of whether the shocks be of a maximum or minimum character.

Obviously some features of this invention may be embodied in other and widely differing forms to that illustrated; therefore without limiting the same to shock absorbers of the particular type described, or enumerating equivalents, I reserve the right to such adaptations or modifications thereof as are encompassed by reasonable interpretation accorded the following claims.

Having thus described my invention what I claim is:—

1. In a shock absorbing device employing a semi-solid element as the checking medium, a stator embodying baffle means, and a rotor in the form of an interengaged enclosing casing with baffles alternating that of the stator.

2. In a shock absorbing device employing a semi-solid dry element as the checking medium, a stator embodying baffle means, and a rotor in the form of an interengaged enclosing casing with adjustable baffle means alternating that of the stator.

3. In a shock absorbing device employing a semi-solid dry element as the checking medium, a stator having integral radial vanes, and a rotor in the form of an interengaged enclosing casing with radial vanes alternating those of the stator.

4. In a shock absorbing device employing a semi-solid dry element as the checking medium, a stator with integral radial vanes, and a rotor in the form of a fluid-tight interengaged enclosing casing also having radial vanes alternating with those of the stator.

5. In a shock absorbing device employing a semi-solid dry element as the checking medium, a stator embodying integral axially-merging radial baffles, and a rotor in the form of a fluid-tight casing threadedly-engaging the stator and having radial wings alternating the stator baffles.

6. In a shock absorbing device employing a semi-solid dry element as the checking medium, a cupped stator with integral axially-merging radial baffles, a correspondingly-shaped rotor threadedly-engaging and closing in the stator, and a spider secured within the rotor having radial wings alternating the stator baffles.

7. In a shock absorbing device employing a semi-solid dry element as the checking medium, a cupped stator with integral axially-merging radial baffles, a correspondingly-shaped rotor threadedly-engaging and closing in the stator, and a spider secured within the rotor having radial wings alternating the stator baffles, said wings and baffles terminating radially short of the stator inner wall and the rotor hub with provision of flow clearances.

8. In a shock absorbing device for automotive vehicles employing a semi-solid dry element as the checking medium, a cupped stator with integral tapering-section radial baffles, a similarly-shaped rotor threadedly-engaging and closing in the stator, and a spider co-axially within the rotor embodying rectangular-section wings alternating the stator baffles, the aforesaid baffles terminating radially short of the spider hub and the wings similarly short of the stator inner surrounding and end walls with provision of appreciable flow clearances.

9. In a shock absorbing device for automotive vehicles employing a semi-solid dry element as the checking medium, a cupped stator with integral tapering-section radial baffles, a similarly-shaped rotor threadedly engaging and closing in the stator, a spider co-axially within the rotor embodying rectangular-section wings alternating the stator baffles, the aforesaid baffles terminating radially short of the spider hub and the wings similarly short of the stator inner surrounding and end walls with provision of appreciable flow clearances, means co-ordinating the rotor with a wheel axle or axles, and means for mounting the device on the vehicle underframe.

In testimony whereof, I have hereunto signed my name at Reading, Pennsylvania, this 13th day of June, 1930.

RAYMOND HEIZMANN.